INVENTOR
BERNARD J. LECHNER
BY Samuel Cohen
ATTORNEY

INVENTOR
BERNARD J. LECHNER
BY [signature]
ATTORNEY 3,532,813

DISPLAY CIRCUIT INCLUDING CHARGING CIRCUIT AND FAST RESET CIRCUIT

Bernard J. Lechner, Princeton, N.J., assignor to RCA Corporation, a corporation of Delaware Filed Sept. 25, 1967, Ser. No. 670,043
Int. Cl. H04n 5/66
U.S. Cl. 178—7.3 8 Claims

ABSTRACT OF THE DISCLOSURE

Matrix of display means each such means including a display element such as a nematic liquid crystal cells and a storage element. A circuit which serves both as a low impedance path to permit charge to be delivered to the two elements in parallel and as a fast reset circuit for the display element connects these two elements.

BACKGROUND OF THE INVENTION

Nematic liquid crystals are described in copending application "Electro-Optical Device," Ser. No. 627,515, filed Mar. 31, 1967 by George H. Heilmeier and Louis A. Zanoni and assigned to the same assignee as the present application. Such crystals, when in an unexcited state, are relatively transparent to light and, when in an excited state, scatter light. In the crystals described in the application, the light scattering, termed "dynamic scattering," results from turbulence developed in the liquid crystal at the region at which it is excited. This type of liquid crystal element may be employed in reflective absorptive and transmissive type flat panel displays, in light shutters and in other applications.

The object of this invention is to provide a new and improved way of arranging liquid crystal elements in a matrix.

SUMMARY OF THE INVENTION

The matrix of the invention includes a plurality of display means each having a display element such as a nematic liquid crystal cell of the type exhibiting dynamic scattering and a storage element such as a capacitor. A fast rest pulse generator of low internal impedance interconnects the display and storage elements in such a way that both may be charged in parallel and the display element may be reset through the storage element.

DETAILED DESCRIPTION

Figure 1:
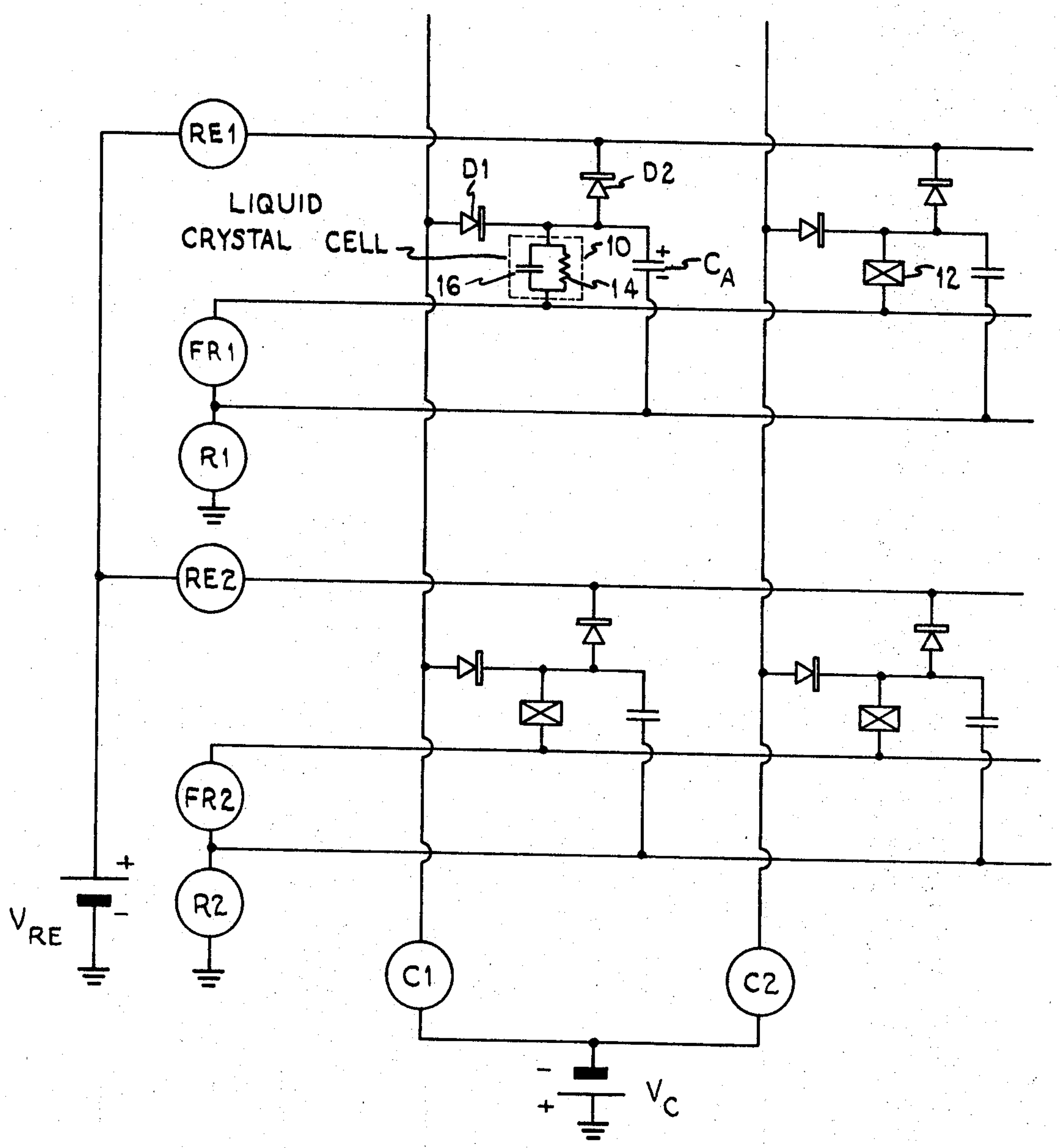
FIG. 1 is a block and schematic diagram of a display matrix according to the present invention.

For purposes of illustration, a two-by-two matrix of storage elements is illustrated in FIG. 1. However, it is to be understood that, in practice, the matrix may have many more elements than this. Each display means includes a liquid crystal cell such as shown at 10 in equivalent circuit form and as shown at 12 in block form. Each such cell may be considered to consist of an internal resistance 14 shunted by a capacitance 16. Each display means also includes a capacitor $C_A$ connected in shunt with the liquid crystal cell through the relatively low impedance of a fast reset pulse generator such as FR1.

The addressing means for each location comprises two diodes D1 and D2. One diode D1, employed to write (to charge the liquid crystal cell), is connected at its cathode to the display means and to the anode of diode D2 and at its anode to a column of the matrix. The other diodes, such as D2, which are employed to erase the respective cells, are connected at their cathodes to the rows of the matrix. The diodes such as D2 are normally reverse biased by a positive voltage supplied by a bias source shown as a battery $V_{RE}$. The diodes such as D1 are back biased by a negative voltage supplied by bias source $V_C$.

There is a row pulse generator connected to each row of the matrix. Two such generators R1 and R2 are shown. There is a column pulse generator connected to each column of the matrix and two such column pulse generators are shown at C1 and C2. There is a reset pulse generator connected to each row of the matrix. There is also a fast reset pulse generator associated with each row of the matrix.

Figure 2:
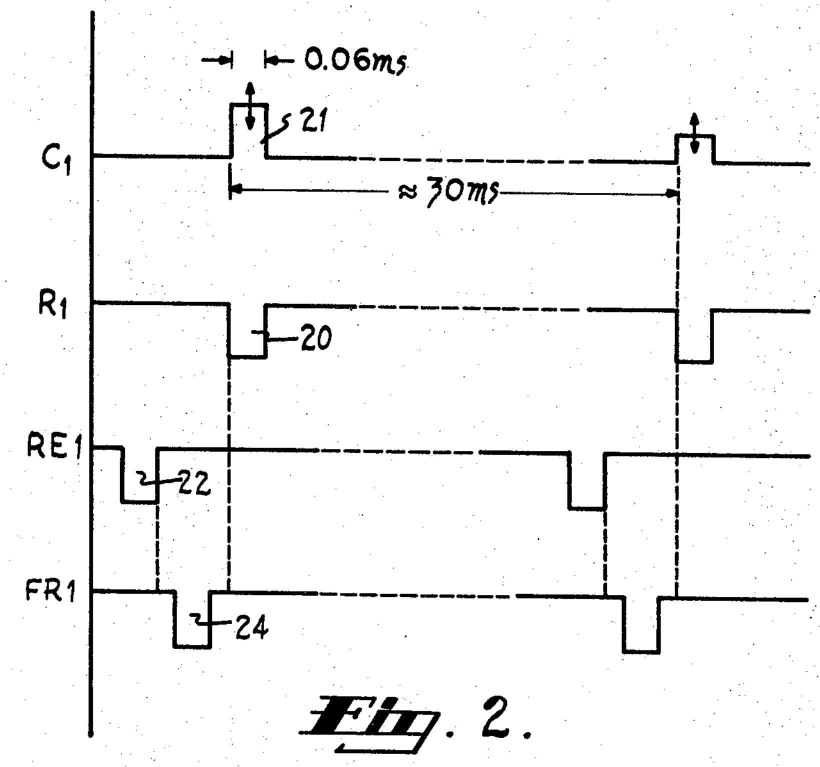
FIG. 2 is a drawing of waveforms to help explain the operation of the matrix of FIG. 1.

In the discussion which follows of the operation of the circuit of FIG. 1 both FIGS. 1 and 2 should be referred to.

The matrix of FIG. 1 may be addressed a row at a time. In other words, each time a row generator is actuated, all of the column generators are concurrently actuated so that, for example, one row interval, 0.06 millisecond in commercial television applications, is available for charging the liquid crystal cells of the row being addressed. (Shorter time durations than this such as the 0.01 millisecond retract interval, may be used instead.) The column generators C1, C2, and so on, provide pulses corresponding in amplitude to the amplitude of the signal to be displayed at each point along the row being addressed and the amplitudes of these pulses determine the extent to which the liquid crystal cells to which these pulses are applied, will "light up," that is, the extent to which these liquid crystal cells will scatter incident light.

To turn on a liquid crystal cell, a row generator such as R1 applies a negative pulse such as 20 of FIG. 2 to a row of liquid crystal cells at the same time that a column pulse generator such as C1 applies a positive pulse such as 21 to a column of elements. The row and column pulses in coincidence are of sufficient amplitude to overcome the bias on a diode such as D1 and charge flows through this diode and through the two paths consisting of, on the one hand, the capacitor $C_A$ and on the other hand, the fast reset pulse generator FR1 and the liquid crystal cell 10. The fast reset pulse generator has a relatively low internal impedance and therefore the two paths appear to the column and row generators to be simply the liquid crystal cell in shunt with the capacitor $C_A$.

In the event that it is desired that the liquid crystal cell light up, the amplitude of the column pulse must be such that when added to that of the row pulse, it exceeds the threshold of diode D1 and reverse biased by source $V_C$ by an amount sufficient to cause dynamic scattering to occur in the liquid crystal cell. The capacitor $C_A$, which normally has a capacitance of ten or more times that of the internal capacitance 16 of the liquid crystal cell 10, becomes charged in response to the concurrent receipt of a row and column pulse. After these pulses have terminated, this capacitor $C_A$ discharges into the liquid crystal cell maintaining it in its dynamic scattering condition. It should be mentioned here again that the fast reset pulse generator FR1 has a relatively low internal impedance compared to the internal resistance of the liquid crystal cell so that the capacitor $C_A$ appears to be directly connected across the liquid crystal cell.

The diode D1 is poled in the reverse direction with respect to the discharge of capacitor $C_A$ so that this capacitor cannot discharge through a column generator. The diode D2 is poled in the forward direction with respect to the discharge of capacitor $C_A$, however, the bias source $V_{RE}$ back biases diode D2 to an extent such that it cannot conduct. (As an aside, diode D1 is also back biased but by the source $V_C$.)

Immediately prior to the time that it is desired again to write information into a liquid crystal cell, the reset pulse generator for the row containing that cell is turned on. For example, for the cell 10, the reset pulse generator RE1 is turned on and it applies a negative pulse such as 22 of FIG. 2 to the diodes D2 of row 1. This pulse is of sufficient amplitude to overcome the back bias on the diodes D2, and the capacitors $C_A$ and 16 discharge through these diodes. The pulse duration may be perhaps 0.010–0.015 millisecond, however, longer pulses may also be used.

While one might, on first consideration, assume that the discharge of the capacitors 16 and $C_A$ would cause the liquid crystal cell immediately to go "dark," that is, immediately to switch from its light scattering condition to the condition in which it does not scatter light, this does not occur. The mechanical relaxation time of the domains of the liquid cell is relatively long—of the order of tens of milliseconds. This general problem is discussed in detail in copending application "Turn Off Method And Circuit For Liquid Crystal Display Element," Serial No. 667,858 filed on or about Sept. 14, 1967 by George H. Heilmeier and assigned to the assignee of the present application. This copending application also indicates that the liquid crystal cell may be turned off by applying thereto a short-duration, relatively high-amplitude pulse during a period in which the liquid crystal cell is not permitted to retain charge. Such a pulse causes the domains of the liquid crystal cell to align and this causes the scattering exhibited by the cell to reduce to a very value.

Fast reset circuits for producing such pulses are shown in FIG. 1 at FR1 and FR2. After a pulse produced by a reset generator such as RE1 terminates, a fast reset pulse generator such as FR1 applies a pulse across the capacitor $C_A$ and the liquid crystal cell. The duration of this pulse, shown at 24 in FIG. 2, is sufficiently short that turbulence is not created in the liquid crystal. The actual duration depends upon the cell thickness, temperature, material and other parameters. By way of example, the Heilmeier application states that the erase pulse (the fast turn-off pulse) for a particular cell 0.0005 inch thick, may have a duration of 0.06 millisecond and an amplitude of 75 to 150 volts. Other cells having different parameters have been operated with fast turn-off pulses of longer duration (0.1 to 1 millisecond) and higher amplitudes (150–250 volts).

The fast reset pulse occurs after the pulse produced by the reset pulse generator and before the row and column pulses. As the fast reset pulse generator has relatively low internal impedance, the charge which accumulates on capacitors $C_A$ or 16 discharges so rapidly that no turbulence can be created in the liquid crystal cell.

In the arrangement of FIG. 1, only one fast reset pulse generator is required per row. This fast reset pulse generator serves two functions as should be clear from the explanation above. It serves as a relatively low impedance connection between the capacitors $C_A$ and the liquid crystal elements and it also serves to turn off the liquid crystal cells.

Figure 3:
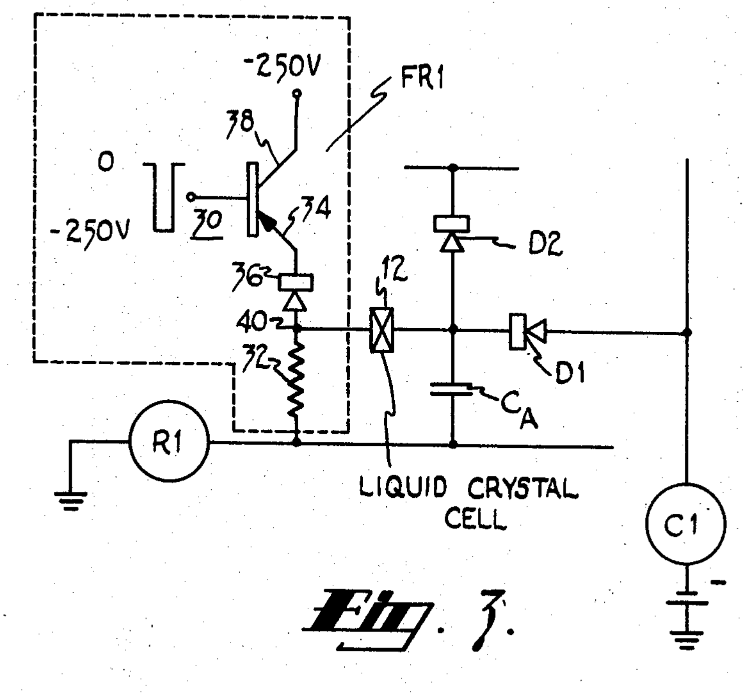
FIG. 3 is a block and schematic drawing of a fast reset generator of the type suitable for use in the matrix of FIG. 1.

An embodiment of a fast reset pulse generator which is suitable for use in the present invention is shown in FIG. 3. In includes a PNP-transistor 30 connected as an emitter-follower. The resistor 32 of the transistor circuit is connected to the emitter 34 through a diode 36. The resistor 32 may have a value of say 10,000 ohms and this is only a small fraction of the internal resistance of the liquid crystal cell 12. The latter may have an internal resistance in the range of $10^8$–$10^9$ ohms or so.

In the operation of the circuit of FIG. 3, the resistor 32 normally acts as a relatively low value of impedance which connects the capacitor $C_A$ across the liquid crystal cell 12. The base and emitter of the transistor are normally at ground and the transistor normally does not conduct.

When it is desired to apply a fast reset pulse to the circuit, a −250 volt pulse is applied to the base of the transistor and this drives the transistor into heavy conduction. Approximately −250 volts now appears at point 40 in the circuit and a fraction of this 250 volts develops across resistor 32. In the circuit shown, the portion of the 250 volts which appears across this resistor depends upon the value of the internal resistance of the low pulse generator R1. Preferably, this internal impedance is relatively low so that the major portion of the 250 volt pulse appears across resistor 32 and this fast reset voltage pulse is applied across the circuit consisting of the liquid crystal cell 12 and the capacitor $C_A$. Since the internal capacitance of the liquid crystal cell 12 is only a small fraction of the value of the internal capacitance of the capacitor $C_A$, (the capacitive reactance of cell 12 is much much higher than that of capacitor $C_A$) the major portion of the voltage pulse across resistor 32 appears across the liquid crystal cell.

The diode 36 is in the circuit to protect the emitter-to-base diode of transistor 30. In the absence of this diode, the row pulse, which may have an amplitude of −30 to −40 volts, would be applied directly across the emitter-to-base diode, in the reverse direction, and this would damage the particular transistor employed.

What is claimed is:

1. In combination:

a liquid crystal cell of the type which exhibits dynamic scattering and having two terminals;

a storage element having two terminals connected at one terminal to one of said terminals of the liquid crystal cell; and a reset pulse source connected between the other said terminal of said liquid crystal cell and the other terminal of said storage element for applying a reset pulse across said two elements and serving also as a relatively low impedance connection between said other terminal of said liquid crystal cell and said other terminal of said storage element.

2. In the combination set forth in claim 1, said storage element comprising a capacitor of a value at least ten times greater than that of the internal capacitance of said liquid crystal cell.

3. A display panel comprising in combination:

a matrix of display means each such means including a displaye element and a capacitor element;

a fast reset circuit connected across said two elements for applying a fast reset signal to the display element through the capacitor element; and a charge supplying circuit connected to said two elements for supplying charge to two branch circuits in parallel, one of the branch circuits including one of said elements and at least a portion of said fast reset circuit, said portion having relatively low impedance compared to that of said one element, and the other branch circuit comprising the other element.

4. A display panel as set forth in claim 3, wherein one of said branch circuits contains the display element and said portion of said fast reset circuit and the other of said branch circuits contains said capacitor element.

5. A display panel as set forth in claim 4, wherein said display element comprises a liquid crystal cell of the type which exhibits dynamic scattering.

6. A display panel as set forth in claim 3, wherein there is a single fast reset circuit per row of the matrix, a portion of said fast reset circuit serving as the relatively low impedance connection between the two elements of each display means in said row.

7. In combination:

a matrix of display means, each such means including a two terminal display element and a two terminal capacitor connected at one terminal to one terminal of the display element, said one terminal comprising a common terminal;

a fast reset circuit connected between the other terminal of the display element and the other terminal of the capacitor for applying a fast reset signal to the display element through the capacitor for changing the light affecting properties of the display element; and a charge supplying circuit connected at one terminal to the fast reset circuit and at another terminal to said common terminal of said display element and said capacitor, for supplying charge to both said capacitor and said display element, in parallel, for energizing the display element.

8. A display panel as set forth in claim 7 wherein said display element comprises a liquid crystal cell.

References Cited

UNITED STATES PATENTS 3,371,230 2/1968 Blank et al. ------ 313—108 B

RICHARD MURRAY, Primary Examiner

G. G. STELLAR, Assistant Examiner

U.S. Cl. X.R.

178—7.5; 315—169; 350—160